(12) United States Patent
McClelland

(10) Patent No.: US 7,894,578 B2
(45) Date of Patent: Feb. 22, 2011

(54) E911 LOCATION SERVICES FOR USERS OF TEXT DEVICE RELAY SERVICES

(75) Inventor: William A. McClelland, Cedar Rapids, IA (US)

(73) Assignee: Verizon Business Global LLC, Basking Ridge, NJ (US)

( * ) Notice: Subject to any disclaimer, the term of this patent is extended or adjusted under 35 U.S.C. 154(b) by 1300 days.

(21) Appl. No.: 11/421,940

(22) Filed: Jun. 2, 2006

(65) Prior Publication Data

US 2007/0280428 A1    Dec. 6, 2007

(51) Int. Cl.
*H04M 11/00* (2006.01)
(52) U.S. Cl. .......................................... 379/45; 379/52

(58) Field of Classification Search ................... 379/45, 379/52, 93.15; 455/404.1, 404.2
See application file for complete search history.

(56) References Cited

U.S. PATENT DOCUMENTS

| | | | |
|---|---|---|---|
| 2005/0226394 A1* | 10/2005 | Engelke et al. | 379/52 |
| 2005/0265326 A1* | 12/2005 | Laliberte | 455/404.1 |
| 2007/0064888 A1* | 3/2007 | Nola et al. | 379/93.15 |

* cited by examiner

*Primary Examiner*—Stella L Woo

(57) ABSTRACT

A system receives, from a text device, an emergency call placed by a hearing-impaired party, the emergency call being associated with information identifying a location of the text device. The system also identifies a public safety answering point (PSAP) based on the location information. The received emergency call may be forwarded to the identified PSAP.

17 Claims, 6 Drawing Sheets

E911 LOCATION SERVICES FOR USERS OF TEXT DEVICE RELAY SERVICES

BACKGROUND INFORMATION

Emergency 9-1-1 service has been designated in the U.S. as the emergency system for public use for emergency reporting and making emergency assistance requests to public safety agencies. Calls to 9-1-1 typically initiate dispatch of emergency service providers (ESPs) (e.g., law enforcement, firefighters, emergency medical service (EMS)) to the scene of the emergency. An integral functional feature of the existing 9-1-1 infrastructure is that a call placed to 9-1-1 from anywhere within a particular calling region can be quickly directed to the most geographically appropriate ESP, in lieu of a need to directly dial the ten digit telephone number of the ESP.

Current 9-1-1 service has specific processing features that are designed to improve its functionality (e.g., ease of use, uniformity, etc.) and reflect that time is of the essence in handling an emergency call. An enabling process for such features is the capability to determine, from call signal information (i.e., automatically), the geographic location of the calling party. The geographic source of the call must be sufficiently precise so that the call can be immediately routed from anywhere within the calling region in which it is placed, to a designated public safety answering point (PSAP) in a given jurisdiction (e.g., municipality, county, etc.), where it is first "answered" by an operator or "call taker." The call can then be forwarded to the appropriate ESP for disposition based upon proximity to the emergency site.

The 9-1-1 wireline infrastructure is designed to automatically route public switched telephone network (PSTN)-based 9-1-1 calls to a designated PSAP based on the ten digit automatic number identification (ANI) of the phone used to call 9-1-1. The PSAP then confirms the location of the source of the call by using the ANI to query subscriber area location information registered in a local exchange carrier (LEC)-owned distributed database network. ESP dispatch can then be made to the registered address associated with the call, even in instances in which the caller cannot convey location information.

Updates have been made to the 9-1-1 wireline infrastructure to handle wireless 9-1-1 calls. Wireless calls to 9-1-1 are routed to the correct PSAP based on cell identification (ID) information and/or pseudo ten digit ANIs that are generated by cellular service providers. The PSAP determines caller location by either referencing cell ID-based information or the address associated with the latitude/longitude of the caller provided by the cellular carrier. In both cases, area location ID information can be referenced by the PSAP to direct dispatch.

Telecommunications relay (telerelay) services (TRS) link parties who are hearing-impaired, including the deaf or the speech-disabled, to the hearing community via a relay center operated by a relay service provider. A deaf, hearing-impaired, or speech-disabled party may access the relay center using a text device, such as a telecommunication device for the deaf/teletype (TDD/TTY). From the relay center, a relay operator or "communications assistant" voices text received from the text device and conversely, texts what is voiced.

Emergency calls from the hearing-impaired may be placed from portable text devices, such as voice over IP (VoIP) phone devices. Such calls, whether placed to 9-1-1 or to the relay service provider, may not convey the caller location information described above with respect to wireline/wireless calls when the portable text device is being used anywhere other than its registered location. Therefore, emergency calls placed from portable text devices cannot be automatically routed to the geographically appropriate PSAP on a reliable basis. Moreover, even in cases in which appropriate PSAP routing can be achieved, the hearing-impaired caller's precise location information may not be known, thus making dispatching difficult in circumstances in which the hearing-impaired caller cannot confirm location information.

BRIEF DESCRIPTION OF THE DRAWINGS

The accompanying drawings, which are incorporated in and constitute a part of this specification, illustrate an embodiment of the invention and, together with the description, explain concepts consistent with principles of the invention. In the drawings.

DETAILED DESCRIPTION OF PREFERRED EMBODIMENTS

Overview

The following detailed description of implementations consistent with principles of the invention refers to the accompanying drawings. The same reference numbers in different drawings may identify the same or similar elements. Also, the following detailed description does not limit the invention. Instead, the scope of the invention is defined by the appended claims and their equivalents.

Implementations consistent with principles of the invention use geographic location information from a text device for routing an emergency call from the text device to the appropriate PSAP. In one implementation, location information may be provided from the text device to a relay service provider who forwards the call and the location information to the PSAP based on the location information.

"Emergency text call," or "9-1-1 text call," as the terms are used herein, are to be broadly interpreted to include any suitable transmission of a signal message to an emergency number in which any portion of the communication includes transmitting or receiving text. Emergency text calls may include, for example, analog, digital, and wireless transmissions that are subject to any known signal processing. An emergency text call may include voice, text, image, video, page signaling, etc., in any format. An emergency text call may originate from any known method for initiating a call such as manual dialing, voice command, activating a dedicated switch, etc.

"Emergency number," as the term is used herein, is to be broadly interpreted to include, for example, the numeric string, 9-1-1. In addition, systems consistent with principles of the invention may operate to any suitable universalized dialing sequence or code associated with any known or existing "9-1-1 service," as well as any contemplated IP-based "9-1-1 network," which terms are to be broadly interpreted to include any location-sensitive emergency response service.

"Hearing-impaired," as the term is used herein, is to be broadly interpreted, to include, parties who are, for example, deaf or hard of hearing, as well as speech-disabled, or parties who are otherwise unable to use telecommunications in which speaking and hearing are used to communicate.

Exemplary System

Figure 1:
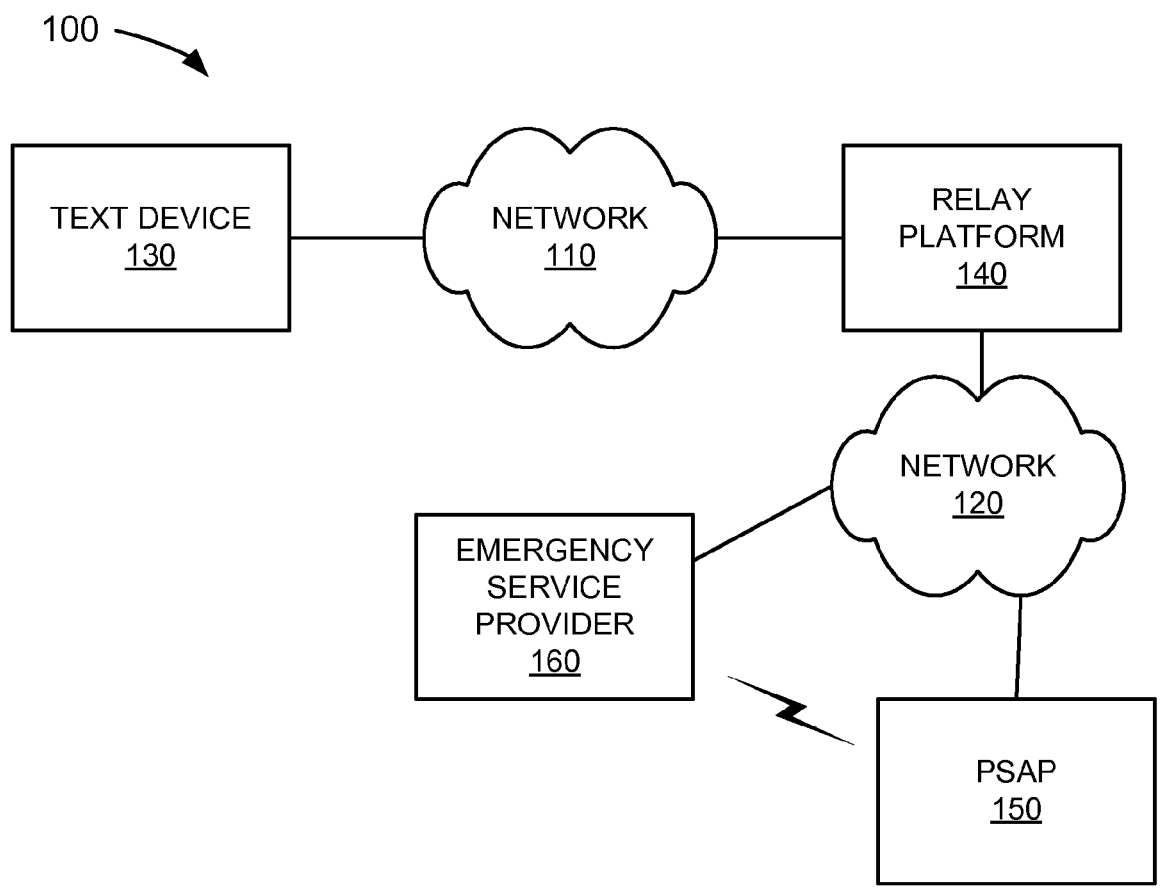
FIG. 1 illustrates an exemplary system in which systems and methods, consistent with principles of the invention, may be implemented.

FIG. 1 illustrates an exemplary system 100 in which systems and methods, consistent with principles of the invention, may be implemented. As illustrated, system 100 may include a text device 130 that connects to a relay platform 140 via a network 110. Relay platform 140 may connect to a PSAP 150 via a network 120. PSAP 150 may connect to emergency service provider (ESP) 160. System 100 may include a gateway 160 that connects to relay platform 140 and network 120. The number of text devices, relay platforms, PSAPs, ESPs, gateways, and networks illustrated in FIG. 1 is provided for simplicity. In practice, a typical system could include more or fewer text devices, relay platforms, PSAPs, ESPs, gateways, and networks than illustrated in FIG. 1.

Networks 110 and 120 may include a local area network (LAN), a wide area network (WAN), a telephone network, such as the Public Switched Telephone Network (PSTN), an intranet, the Internet, or a combination of these or other networks. Although shown as separate networks, networks 110 and 120 may, in one implementation consistent with principles of the invention, be implemented as a single network.

Text device 130 may include a device for transmitting and/or receiving text communications, such as a TDD/TTY, a personal computer (PC), a laptop, a personal digital assistant (PDA), a wireless telephone, an Internet protocol (IP) telephone, etc., one or more threads or processes running on these or other types of devices, and/or one or more objects executable by these devices. Text device 130 may include components as described in detail below with respect to FIG. 2. Text device 130 may be a portable device. In one implementation, text device 130 may include voice capabilities. For example, text device 130 may allow a hearing-impaired user to place calls, including emergency (e.g., 9-1-1) calls, using VoIP. Text device 130 may connect to network 110 via any technique, such as wired, wireless, or optical connections.

Relay platform 140 may include one or more devices that facilitate the establishment of calls between text device 130 and PSAP 150. Relay platform 140 may include components as described in detail below with respect to FIG. 3. In one implementation consistent with principles of the invention, relay platform 140 may be associated with a relay service provider, a VoIP provider, a network service provider, or another party. Relay platform 140 may connect to networks 110 and 120 via any technique, such as wired, wireless, or optical connections.

PSAP 150 may include one or more devices for receiving and processing emergency calls (e.g., 9-1-1 calls). For example, PSAP 150 may include a public entity having personnel (e.g., operators or call takers) and/or equipment for initially answering or fielding incoming 9-1-1 calls. PSAP 150 may be located in the vicinity of the source of the emergency call and in the vicinity of ESPs to which the call can be forwarded. PSAP 150 may connect to network 120 via any technique, such as wired, wireless, or optical connections.

ESP 160 may include any emergency response entity that may be located in the vicinity of an emergency caller, i.e., the site of the emergency. For example, ESP 160 may include authorities such as law enforcement, firefighting, and/or emergency medical service (EMS) personnel, who may be dispatched to the emergency scene. ESP 160 may connect to PSAP 150 via any technique, such as wired, wireless, or optical connections.

Exemplary Text Device Configuration

Figure 2:
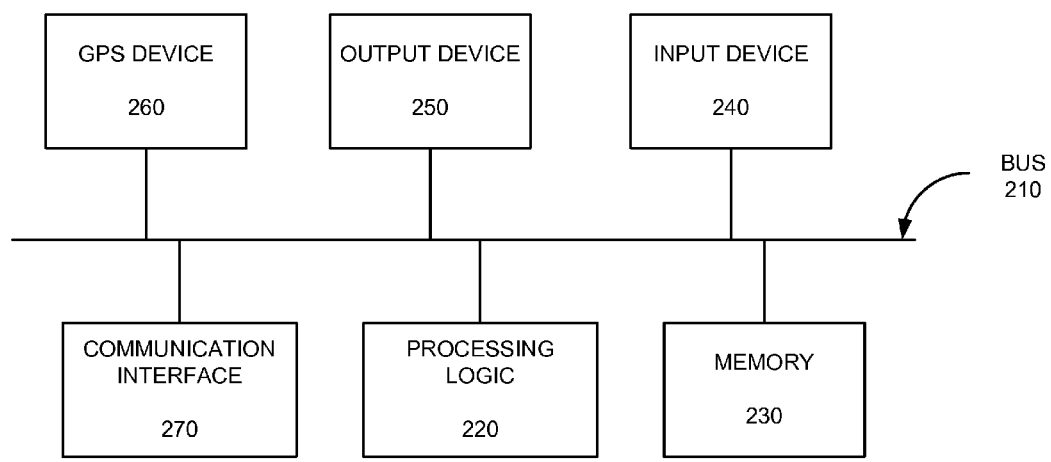
FIG. 2 illustrates an exemplary configuration of the text device of FIG. 1 in an implementation consistent with principles of the invention.

FIG. 2 illustrates an exemplary configuration of text device 130 in an implementation consistent with principles of the invention. As illustrated, text device 130 may include a bus 210, processing logic 220, a memory 230, an input device 240, an output device 250, a global positioning satellite (GPS) device 260, and a communication interface 270. It will be appreciated that text device 130 may include other components (not shown) that aid in receiving, transmitting, and/or processing data. Moreover, it will be appreciated that other configurations are possible.

Bus 210 may permit communication among the components of text device 130. Processing logic 220 may include any type of processor or microprocessor that interprets and executes instructions. In other implementations, processing logic 220 may be implemented as or include an application specific integrated circuit (ASIC), field programmable gate array (FPGA), or the like. Memory 230 may include a random access memory (RAM) or another type of dynamic storage device that stores information and instructions for execution by processing logic 220, a read only memory (ROM) or another type of static storage device that stores static information and instructions for the processing logic 220, and/or some other type of magnetic or optical recording medium and its corresponding drive for storing information and/or instructions.

Input device 240 may include a device that permits a user to input information to text device 130, such as a keyboard, a keypad, a mouse, a pen, a microphone, one or more biometric mechanisms, and the like. Output device 250 may include a device that outputs information to the user, such as a display, a printer, a speaker, etc.

GPS device 260 may include one or more devices for receiving GPS-based location information from, for example, a GPS satellite. GPS device 260 may be included within text device 130 or external to text device 130. For example, GPS device 260 may be implemented as an external GPS receiver or a Personal Computer Memory Card International Association (PCMCIA) card with integral GPS receiver that continuously receives GPS-based location information. GPS device 260 may store received GPS-based location information in, for example, memory 230, GPS device 260, or some other location.

Communication interface 270 may include any transceiver-like mechanism that enables text device 130 to communicate with other devices and/or systems. For example, communication interface 270 may include mechanisms for communicating with relay platform 140 via a network, such as network 110.

As will be described in detail below, text device 130, consistent with principles of the invention, may allow a hearing-impaired user to place an emergency call. Text device 130 may perform these and other functions in response to processing logic 220 executing software instructions contained in a computer-readable medium, such as memory 230. A computer-readable medium may be defined as one or more memory devices and/or carrier waves. The software instructions may be read into memory 230 from another computer-readable medium or from another device via communication interface 270. The software instructions contained in memory 230 may cause processing logic 220 to perform processes that will be described later. Alternatively, hardwired circuitry may be used in place of or in combination with software instructions to implement processes consistent with principles of the invention. Thus, systems and methods consistent with principles of the invention are not limited to any specific combination of hardware circuitry and software.

Exemplary Relay Platform Configuration

Figure 3:
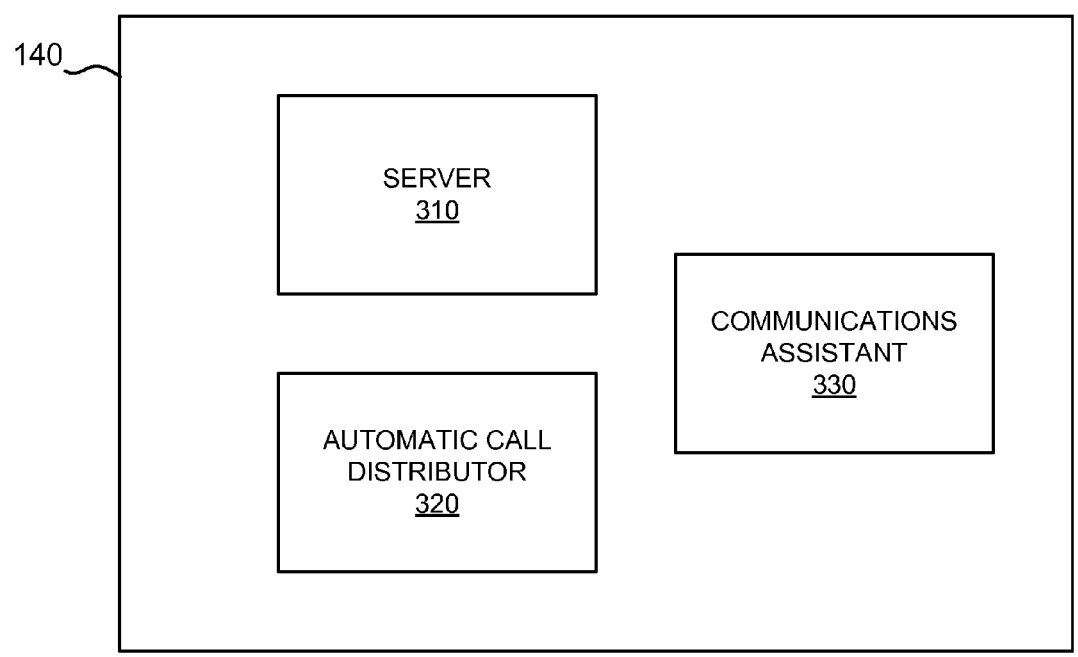
FIG. 3 illustrates an exemplary configuration of the relay platform of FIG. 1 in an implementation consistent with principles of the invention.

FIG. 3 illustrates an exemplary configuration of relay platform 140 in an implementation consistent with principles of the invention. As illustrated, relay platform 140 may include a server 310, an automatic call distributor (ACD) 320, and a communications assistant 330. It will be appreciated that relay platform 140 may include other components (not shown) that aid in receiving, transmitting, and/or processing data.

Server 310 may include one or more devices that receive a call, such as an emergency call, from text device 130, identify an appropriate PSAP based on location information associated with the call, such as PSAP 150, for handling the call, and transmit the call and emergency information to ACD 320 for forwarding. Server 310 may be implemented in hardware, software, or a combination of hardware and software.

ACD 320 may include one or more devices that receive calls forwarded by server 310, such as emergency calls received from a of text device 130. ACD 320 may distribute the call to an appropriate communications assistant, such as communications assistant 330. ACD 320 may be implemented in hardware, software, or a combination of hardware and software.

Communications assistant 330 may include one or more systems, such as a workstation and, for example, personnel for processing text/voiced communications. In one implementation, communications assistant 330 may perform text-to-voice and/or voice-to-text conversion. Communications assistant 330 may also be configured to perform transliteration of written American Sign Language (ASL), or other sign language, into conversational English (and vice versa). Communications assistant 330, consistent with the present invention, may also include any device capable of performing IP-based messaging, such as VoIP, to transmit voice and/or text via network 110.

Communications assistant 330 may be used in any telerelay services (TRS) environment, such as a voice carry over (VCO) environment, a hearing carry over (HCO) environment, a speech-to-speech (STS) environment, etc. Communications assistant 330, consistent with the present invention, may connect to networks 110 and 120 to facilitate communications between hearing-impaired and hearing parties. In an exemplary implementation consistent with principles of the invention, communications assistant 330 may include a voice recognizer that performs voice or speech recognition. The voice recognizer may include software and/or hardware that automatically converts received voice data into text.

Communications assistant 330 may also include a high speed text input device, such as a stenographic device, a communication access real-time translation (CART) device, etc. Communications assistant 330 may also include any conventional telephone (not shown), such as one used by a hearing party, that interfaces with the PSTN to place and receive telephone calls. For example, the telephone device may be a standard telephone, a cordless telephone, a cellular telephone or any other type of conventional telephone. The telephone device may also include any type of device that is capable of transmitting and receiving voice signals to/from a data network. For example, the telephone device may include any client, such as a computer device, a web-based appliance, etc., that is configured to provide telephone functions. The telephone device may, for example, include a SIP-based telephone device, which may include a standalone device. A SIP-based telephone device may also include a software client that may run, for example, on a PC, a laptop, or other computing device.

Exemplary PSAP Configuration

Figure 4:
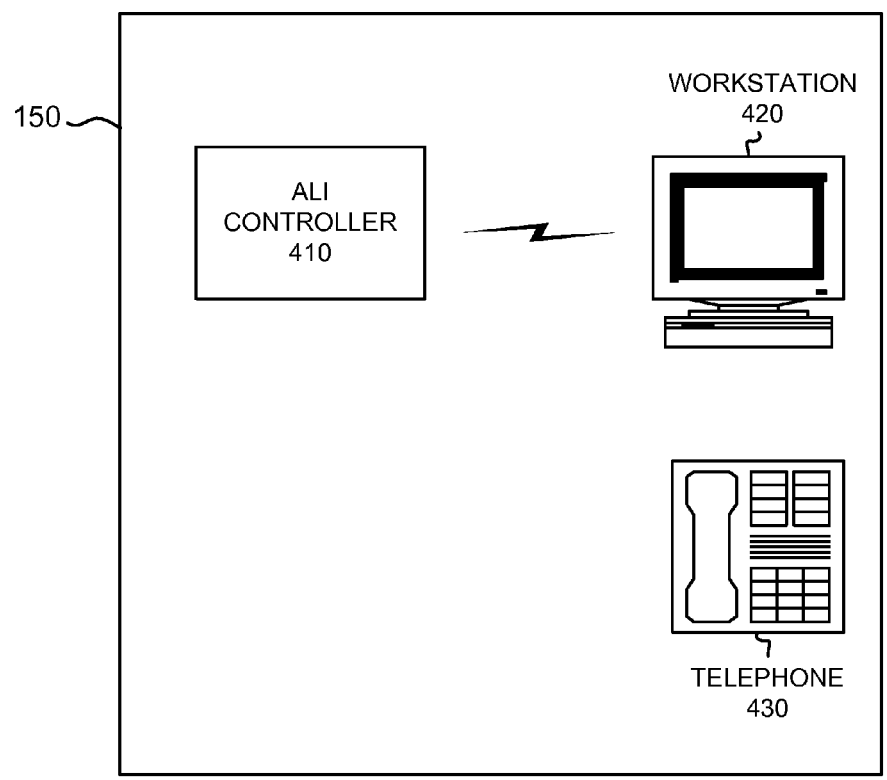
FIG. 4 illustrates an exemplary configuration of the PSAP of FIG. 1 in an implementation consistent with principles of the invention.

FIG. 4 illustrates an exemplary configuration of PSAP 150 in an implementation consistent with principles of the invention. As illustrated, PSAP 150 may include an ALI controller 410, a workstation 420, and a telephone 430. It will be appreciated that PSAP 150 may include other components than illustrated in FIG. 4 that aid in receiving, processing, and/or transmitting data. The number of ALI controllers, workstations, and telephones illustrated in FIG. 4 is provided for simplicity. In practice, a typical PSAP could include more ALI controllers, workstations, and/or telephones than illustrated in FIG. 4.

ALI controller 410 may include one or more devices that receive emergency information from relay platform 140 and process the received emergency information by, for example, identifying the location of call origination. In one implementation consistent with principles of the invention, ALI controller 410 may identify a caller's location based on GPS-based location information included in the emergency information.

Workstation 420 may include one or more types of computer systems, such as a mainframe, minicomputer, a PC, a laptop, etc. that receive emergency information and provide information to an operator in response thereto. The information may include, for example, a callback number (e.g., a telephone number, a network address, etc.) and information identifying a location and/or nature of the emergency. Workstation 420 may, in some situations, forward received calls to ESP 160.

Telephone 430 may include one or more devices that allow an operator at PSAP 150 to conduct communications with the caller via relay platform 140. In one implementation consistent with principles of the invention, telephone 430 may include a plain old telephone system (POTS) telephone, a session initiation protocol (SIP) telephone, a wireless telephone device, etc. In another implementation, telephone 430 may be implemented within workstation 420 or another computer device.

Exemplary Processing

Figure 5:
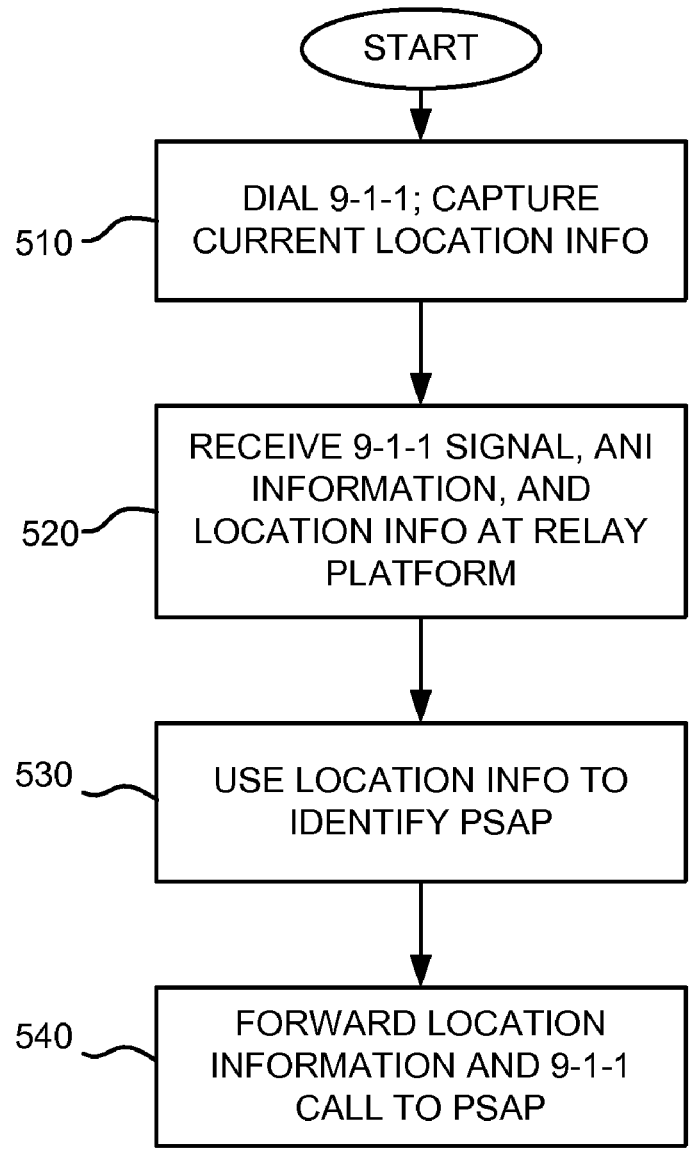
FIG. 5 illustrates an exemplary process for handling an emergency text call in an implementation consistent with principles of the invention.

FIG. 5 illustrates an exemplary process for handling an emergency text call in an implementation consistent with principles of the invention. Processing may begin with a hearing-impaired user placing an emergency text call at a text device, such as text device 130 (act 510). To place the emergency call, the hearing-impaired user may dial 9-1-1 using text device 130. In one implementation, the emergency text call may be placed by activating a designated "emergency" key on text device 130. Placing the 9-1-1 text call may initiate capture of current location information (e.g., GPS data) by text device 130 (act 510), using, for example, GPS device 260. If text device 130 is unable to capture current GPS data, text device 130 may retrieve the recently-captured GPS data from, for example, memory 230.

Text device 130 may be configured to operate in a TRS mode or in a conventional mode. In TRS mode, text device 130 may be configured to automatically connect to relay platform 140 upon text device 130 being placed in use, without the need to dial an access number to access relay platform 140. That is, the 9-1-1 text call (as with any other call) may be automatically routed to relay platform 140. On the other hand, in the conventional mode, the hearing-impaired user of text device 130 may place the 9-1-1 text call by first dialing an access number (e.g., 7-1-1 or a dedicated toll-free number) to access relay platform 140. Alternatively, text device 130 may be configured to automatically convert a dialed 9-1-1 call to 7-1-1 (or other access number), such that the 9-1-1 call may be routed to relay platform 140, without the need for the hearing-impaired user to first dial the access number.

Call information may be received by relay platform 140 (act 520). The call information may include, for example, the 9-1-1 call signal, ANI information for text device 130 (e.g., a telephone number associated with text device 130), and the captured (or recently-captured) GPS data.

In response to receiving the information from text device 130, relay platform 140 may use the GPS data to identify a PSAP to which to direct the 9-1-1 text call (act 530). In one implementation consistent with principles of the invention, relay platform 140 may use the GPS data to determine the location of text device 130. Relay platform 140 may then identify a PSAP that may be proximate to the location of text device 130. It is assumed for explanatory purposes, relay platform 140 identifies PSAP 150 as the geographically closest PSAP to the location of text device 130.

Relay platform 140 may forward the location information and the 9-1-1 text call to PSAP 150 (act 540). In some situations, relay platform 140 may format the location information and/or 9-1-1 text call prior to forwarding. For example, relay platform 140 may convert received text data into voice data. Other types of formatting may alternately be performed. PSAP 150 may then process the 9-1-1 text call from text device 130 by, for example, dispatching the appropriate ESP 160 personnel to the location of text device 130.

Relay platform 140 may also communicate with the hearing-impaired user of text device 130 to confirm or obtain updated location information. In one implementation consistent with principles of the invention, relay platform 140 may, for example, text a request to text device 130, which prompts the hearing-impaired user of text device 130 to provide additional details regarding the emergency site. Relay platform 140 may provide such location information received from text device 130 prior to, in parallel with, or subsequent to providing the information described above with respect to act 540 to PSAP 150.

Figure 6:
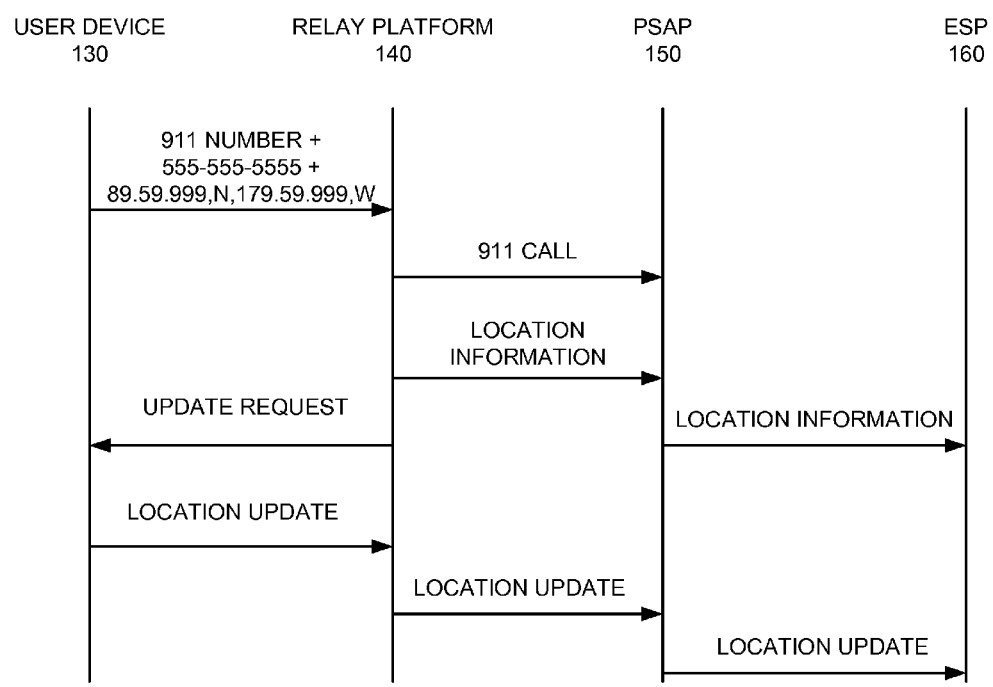
FIG. 6 illustrates exemplary processing of an emergency text call in an implementation consistent with principles of the invention.

The following example illustrates the above processing. FIG. 6 illustrates exemplary processing of a 9-1-1 text call in an implementation consistent with principles of the invention. In this example, assume that a hearing-impaired user at text device 130 places a 9-1-1 text call by dialing 9-1-1. In response, text device 130 may determine its current location by capturing current GPS data. Assume that the text device 130 captures the following GPS data: 89.59.999,N, 179.59.999,W.

Text device 130 may transmit the dialed digits (i.e., 9-1-1), the ANI of text device 130 (assumed to be "555-555-5555" for this example), and the GPS data (i.e., 89.59.999,N, 179.59.999,W) to relay platform 140. In response, relay platform 140 may use the GPS data to identify a PSAP for handling the 9-1-1 text call. It is assumed for this example, that relay platform 140 identifies PSAP 150 as the closest PSAP to the current location of text device 130. Relay platform 140 may forward the 9-1-1 text call from text device 130 to PSAP 150. Relay platform 140 may also forward the location information to PSAP 150.

Relay platform 140 may also send a request to the hearing-impaired user at text device 130 to confirm the location information and/or update the location information, for example, where a change to the initial location has occurred due to the hearing-impaired user's movement. Assume for this example, the hearing-impaired user can converse in American Sign Language (ASL). Relay platform 140 may text the request using ASL vernacular. The hearing-impaired user may reply by text or voice (where the hearing-impaired user is able to speak) using ASL. Relay platform 140 may transliterate the received updated location information into idiomatically correct English, which may then be provided (e.g., text or voice) to PSAP 150. PSAP 150 may provide the updated location information to ESP 160.

CONCLUSION

Implementations consistent with principles of the invention use location information acquired by a text device for routing a 9-1-1 text call from the text device to the appropriate PSAP. In one implementation, the location information includes GPS coordinates that may be provided from a GPS device associated with the text device. Implementations consistent with principles of the invention also allow for updating the location information of the text device via text communications.

In the preceding specification, the invention has been described with reference to specific exemplary implementations thereof. However, the illustrations and description provided are not intended to be exhaustive or to limit the invention to the precise form disclosed. Modifications and variations are possible in light of the above teachings or may be acquired from practice of the invention without departing from the broader spirit and scope of the invention as set forth in the claims that follow. For example, while the above description focused on text device 130, relay platform 140, and PSAP 150 performing certain acts, it will be appreciated that in other implementations consistent with principles of the invention, the acts described above may be performed by another device in system 100. Accordingly, the specification, including the drawings, is to be regarded in an illustrative rather than a restrictive sense.

Moreover, it will be appreciated that in addition to, or as an alternative to, conventional GPS mechanisms, the text device may determine its location using any conventional technique for determining location. Such techniques may include, but are not limited to, determining location using conventional cellular network location services or determining location by performing triangulation of signals transmitted by, for example, AM radio stations. Other techniques may alternatively be used. In addition, the 9-1-1 text call may be directly routed to the PSAP, thereby bypassing the relay platform. Upon directly receiving the 9-1-1 text call, the PSAP may handle the call (e.g., if the PSAP has texting capabilities), forward the call to the relay platform, or establish a conference call that includes the caller, the relay platform, and the PSAP.

While series of acts have been described with respect to FIGS. 5 and 6, the order of the acts may be varied in other implementations consistent with the invention. Moreover, non-dependent acts may be implemented in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with principles of the invention is not limiting of the invention. Thus, the operation and behavior of the aspects of the invention were described without reference to the specific software code-it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit or a field programmable gate array, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system comprising:
   a relay platform to:
   receive, from a mobile texting device, first text data of an emergency call placed to 9-1-1 and forwarded to the relay platform by a public safety answering point (PSAP) identified for the emergency call based on location information acquired by the mobile texting device and identifying a location of the mobile texting device;
   text a request, to a user of the mobile texting device, to update the location of the mobile texting device;
   receive, from the user of the mobile texting device and responsive to the request, second text data including an updated location of the mobile texting device;
   convert the first text data and the second text data into voice data; and
   transmit the voice data to the identified PSAP.

2. The system of claim 1, wherein the location information comprises global positioning satellite (GPS) data.

3. The system of claim 1, wherein the emergency call comprises a voice over Internet protocol (VoIP)-enabled call.

4. The system of claim 1, wherein the first text data includes written American Sign Language (ASL) or spoken ASL, and the relay platform is further configured to translate the ASL into conversational English.

5. The system of claim 1, wherein the mobile texting device is configured to acquire the location information using signal triangulation.

6. The system of claim 1, wherein the emergency call is initiated by dialing 9-1-1 digits on the mobile texting device operating in a telecommunications relay services mode.

7. The system of claim 1, wherein the mobile texting device is configured to acquire the location information upon an initiation of the emergency call.

8. The system of claim 1, wherein the mobile texting device is configured to acquire the location information prior to an initiation of the emergency call.

9. A method comprising:
   receiving, from a mobile texting device, a texted request for emergency services placed to 9-1-1 and forwarded to a relay platform by a public safety answering point (PSAP) identified for providing the emergency services based on location information associated with and acquired by the mobile texting device;
   texting a request, to a user of the mobile texting device, to update the location of the mobile texting device;
   receiving, from the user of the mobile texting device and responsive to the request, text data including an updated location of the mobile texting device;
   converting the text data into voice data; and
   relaying the voice data to the identified PSAP.

10. The method of claim 9, wherein the receiving the texted request comprises receiving a voice over Internet protocol (VoIP)-enabled call forwarded by the relay platform.

11. The method of claim 9, wherein the receiving the texted request comprises receiving a 9-1-1 call transmitted by the mobile texting device, operating in a telecommunications relay services mode, and forwarded by the relay platform.

12. The method of claim 11, further comprising:
   acquiring, by the mobile texting device, the location information associated with the mobile texting device prior to the transmission of the 9-1-1 call.

13. The method of claim 9, wherein the acquiring the location information comprises:
   capturing global positioning satellite (GPS) data.

14. The method of claim 9, further comprising:
   converting the location information into a geographic location; and
   transmitting the geographic location to the identified PSAP.

15. The method of claim 9, wherein the text data comprises American Sign Language (ASL), the method further comprising:
   translating the text data from ASL into conversational English; and
   relaying the additional location information associated with the mobile texting device to the identified PSAP based on the translated text data.

16. The method of claim 9, further comprising:
   relaying communications between the PSAP and the mobile texting device, wherein the relaying the communications comprises:
   translating at least one of American Sign Language (ASL) into conversational English or conversational English into ASL; and
   converting at least one of text to voice or voice to text.

17. A telecommunications relay services platform comprising:
   means for receiving a 9-1-1 call, including first text data, forwarded by a public safety answering point (PSAP) identified based on global positioning satellite (GPS) data acquired by a mobile texting device;
   means for texting a request, to a user of the mobile texting device, to confirm a location of the mobile texting device;
   means for receiving, from the user of the mobile texting device and responsive to the request, second text data including the location of the mobile texting device;
   means for converting the first text data and the second text data into voice data;
   means for transferring the voice data to the identified PSAP; and
   means for subsequently communicating with the mobile texting device by text.

* * * * *